(12) United States Patent
Lian et al.

(10) Patent No.: US 12,308,432 B1
(45) Date of Patent: May 20, 2025

(54) POWER-TYPE HIGH-RATE LITHIUM IRON PHOSPHATE CATHODE MATERIAL AND ITS PREPARATION METHOD AND LITHIUM BATTERY

(71) Applicant: Hunan Yuneng new energy battery materials Co., LTD., Xiangtan (CN)

(72) Inventors: Ping Lian, Xiangtan (CN); Xinqiao Tan, Xiangtan (CN); Tao Chen, Xiangtan (CN); Zeyu Cao, Xiangtan (CN); Shuai Liu, Xiangtan (CN); Jia Tang, Xiangtan (CN)

(73) Assignee: Hunan Yuneng new energy battery materials Co., LTD., Hunan (CN)

( * ) Notice: Subject to any disclaimer, the term of this patent is extended or adjusted under 35 U.S.C. 154(b) by 0 days.

(21) Appl. No.: 19/015,442

(22) Filed: Jan. 9, 2025

(30) Foreign Application Priority Data

Jun. 25, 2024 (CN) .......................... 202410825736.6

(51) Int. Cl.
| | |
|---|---|
| *H01M 4/58* | (2010.01) |
| *C01B 25/45* | (2006.01) |
| *H01M 4/36* | (2006.01) |
| *H01M 4/62* | (2006.01) |
| *H01M 10/052* | (2010.01) |
| *H01M 10/42* | (2006.01) |

(52) U.S. Cl.
CPC ........... *H01M 4/5825* (2013.01); *C01B 25/45* (2013.01); *H01M 4/366* (2013.01); *H01M 4/625* (2013.01); *H01M 4/628* (2013.01); *H01M 10/052* (2013.01); *H01M 10/4235* (2013.01); *C01P 2002/50* (2013.01); *C01P 2004/03* (2013.01); *C01P 2004/62* (2013.01); *C01P 2004/80* (2013.01); *C01P 2006/40* (2013.01)

(58) Field of Classification Search
None
See application file for complete search history.

(56) References Cited

FOREIGN PATENT DOCUMENTS

CN 109103433 A 12/2018

*Primary Examiner* — Carlos Barcena
(74) *Attorney, Agent, or Firm* — Valet Patent Service Limited (57) ABSTRACT

The present application relates to the technical field of lithium batteries and provides a power-type high-rate lithium iron phosphate cathode material, its preparation method, and a lithium battery. The method comprises the following steps: adding iron phosphate, lithium source, and organic carbon source into deionized water for stirring, grinding, drying, calcination, secondary calcination, and crushing to obtain the power-type high-rate lithium iron phosphate cathode material. This method employs functionalized graphene combined with nano lithium iron phosphate. Through a two-stage calcination process, it can suppress the agglomeration of nanized particles and achieve uniform carbon coating. Additionally, nitrogen doping is used to improve the conductivity of graphene and the coated carbon layer. By combining with the nanization of lithium iron phosphate, the ion transport path is shortened, enhancing ion conductivity and electronic conductivity, significantly improving the material's rate performance.

9 Claims, 6 Drawing Sheets

POWER-TYPE HIGH-RATE LITHIUM IRON PHOSPHATE CATHODE MATERIAL AND ITS PREPARATION METHOD AND LITHIUM BATTERY

TECHNICAL FIELD

The present application relates to the technical field of lithium batteries, specifically to a high-rate lithium iron phosphate cathode material and its preparation method and lithium battery.

BACKGROUND

To achieve the development strategic goals of carbon peaking and carbon neutrality, efficient electrochemical energy storage devices will play an important role through years of development and practice. Especially in the field of new energy vehicles, electrochemical energy storage, mainly based on lithium-ion batteries, is currently the most likely new energy storage device to replace fossil energy.

Although the range indicated for electric vehicles is continuously increasing, it often does not reach the theoretical value in actual use. Additionally, charging facilities are not as widespread as gas stations, and charging times are relatively long, causing inconvenience in practical use. To address the current shortcomings of new energy vehicles, the following methods can be employed: (1) Increase the range and/or improve energy density; (2) Enhance fast charging performance, i.e., rate performance. Furthermore, improving rate performance can also make the actual range closer to the indicated range. In terms of cathode materials for power batteries, the current market mainstream comprises ternary materials and lithium iron phosphate. Moreover, with the market competition and application practices in recent years, lithium iron phosphate has captured more than half of the market share due to its high safety, long cycle life, and low-cost advantages. At the same time, with major battery companies innovating in aspects such as power battery structure, the range anxiety of lithium iron phosphate batteries will also be effectively alleviated. This is a significant advancement in the application of lithium iron phosphate batteries. Although the development of lithium iron phosphate batteries is rapid, there is currently a technical bottleneck in the fast-charging performance of these batteries. The technology is not mature enough, resulting in a considerable gap in energy replenishment speed between new energy vehicles and fuel vehicles. Therefore, how to ensure the traditional advantages of lithium iron phosphate materials while achieving an improvement in rate performance and further enhancing market competitiveness is a pressing issue that the entire industry needs to address.

SUMMARY

The technical problem to be solved by the present application is to overcome the deficiencies and defects mentioned in the above background technology and to provide a lithium iron phosphate cathode material with improved rate performance, suitable for high-power charge and discharge, along with its preparation method and lithium battery.

To solve the above technical problem, the technical solution proposed in the present application is:

In the first aspect, the present application provides a preparation method for a power-type high-rate lithium iron phosphate cathode material, which comprises the following steps:

(1) adding iron phosphate, lithium source, and organic carbon source into deionized water, stirring evenly, and grinding to nanoscale to obtain a first mixed slurry;

(2) performing drying treatment on the first mixed slurry obtained in step (1) to obtain a first stage precursor powder;

(3) placing the first stage precursor powder obtained in step (2) in a protective atmosphere for calcination treatment to obtain a first stage calcined material;

(4) adding the calcined material obtained in step (3) with an organic carbon source, functionalized graphene, and a nitrogen source into deionized water, stirring evenly, and grinding to nanoscale to obtain a second mixed slurry;

(5) performing drying treatment on the second mixed slurry obtained in step (4) to obtain a second stage precursor powder;

(6) placing the second stage precursor powder obtained in step (5) in a protective atmosphere for secondary calcination and crushing to obtain power-type high-rate lithium iron phosphate cathode material.

In some embodiments, the lithium source in step (1) is any one or a combination of lithium dihydrogen phosphate, lithium hydroxide, lithium carbonate, lithium phosphate, or lithium acetate, with a molar ratio of the lithium source to iron phosphate of 1~1.05:1, wherein the mass percentage of carbon element in the organic carbon source in the first mixed slurry is 0~20%, and the solid content of the first mixed slurry is 30%~50%.

In some embodiments, the organic carbon source is any one or a combination of citric acid, glucose, sucrose, polyethylene glycol, urea, or polyacrylonitrile.

In some embodiments, the nanoscale particle size D50 is 0.1 μm~1.0 μm.

In some embodiments, the nitrogen source in step (4) is any one or a combination of urea, melamine, ammonia water, or ammonium nitrate, and the contribution rate of the organic carbon source to the product's carbon content in step (4) is 1% to 2%, the contribution rate of the functionalized graphene to the product's carbon content is 0.05% to 0.2%, the addition amount of the nitrogen source is 0.05 mol % to 0.2 mol % of the theoretical nitrogen element doping, and the solid content of the second mixed slurry is 30% to 50%.

Due to the nitrogen doping improving the conductivity of graphene and the coated carbon layer, nitrogen atoms can form stable covalent bonds with carbon atoms, and the lengths of the C—N bond and C—C bond are comparable. The effect of doped nitrogen atoms on the distortion of the graphene lattice is relatively small, making it easier for nitrogen atoms to be doped into carbon materials. Nitrogen doping can also introduce P-type semiconductors, thereby further enhancing the electronic conductivity of the composite material.

In some embodiments, the processing temperature for the calcination described in step (3) is 400° C.~1000° C., and the processing time is 3 h~15 h.

In some embodiments, the drying treatment in step (5) is spray drying.

In some embodiments, the parameters for crushing in step (6) are 0.4~0.6 μm, and the processing temperature for secondary calcination in step (6) is 400° C.~1000° C., with a processing time of 3 h~15 h.

In a second aspect, the present application also provides a power-type high-rate lithium iron phosphate cathode material with the structural formula $Li_xFePO_4@C$, wherein $1 \leq X \leq 1.05$, the C is elemental carbon coated on the outer layer, and the content of the elemental carbon is 0~20% of the total mass of the power-type high-rate lithium iron phosphate cathode material.

Thirdly, the present application also provides a lithium battery, whose cathode is made from the power-type high-rate lithium iron phosphate cathode material obtained by the preparation method described in any of the aspects of the first content or made from the power-type high-rate lithium iron phosphate cathode material described in the second aspect.

Compared with the prior art, the beneficial effects of the present application are:
1. The present application can achieve the suppression of nanization particle agglomeration and ensure uniform carbon coating through a two-stage calcination process.
2. The present application employs functionalized graphene combined with nano lithium iron phosphate to construct a multi-dimensional conductive network from point to surface, while the nanization of lithium iron phosphate shortens the ion transport path, thereby improving the ion conduction rate of the material; Using a nitrogen source for nitrogen doping improves the conductivity of graphene and the coated carbon layer. Nitrogen atoms can form stable covalent bonds with carbon atoms, and the lengths of the C—N bond and C—C bond are comparable. The impact of nitrogen atom doping on graphene lattice distortion is relatively small, making it easier for nitrogen atoms to be doped into carbon materials. Nitrogen doping can also introduce a P-type semiconductor, further enhancing the electronic conductivity of the composite material. By combining the above modification methods, the ion transport path of the power-type high-rate lithium iron phosphate cathode material is shortened, improving ion conductivity and electronic conductivity, and significantly enhancing the material's rate performance.

BRIEF DESCRIPTION OF THE DRAWINGS

To more clearly illustrate the technical solutions in the embodiments or prior art of the present application, a brief introduction to the drawings required for the description of the embodiments or prior art will be provided below. It is evident that the drawings described below are some embodiments of the present application. For those skilled in the art, other drawings can be obtained based on these drawings without creative effort.

DETAILED DESCRIPTION

To facilitate understanding of the present application, a more comprehensive and detailed description will be provided below in conjunction with the accompanying drawings and preferred embodiments, but the protection scope of the present application is not limited to the following specific embodiments.

Unless otherwise defined, all technical terms used below have the same meaning as commonly understood by those skilled in the art. The technical terms used in this document are intended solely for the purpose of describing specific embodiments and are not meant to limit the scope of protection of the present application.

Unless otherwise specified, various raw materials, reagents, instruments, and equipment used in the present application can be obtained from the market or prepared by existing methods.

Figure 1:
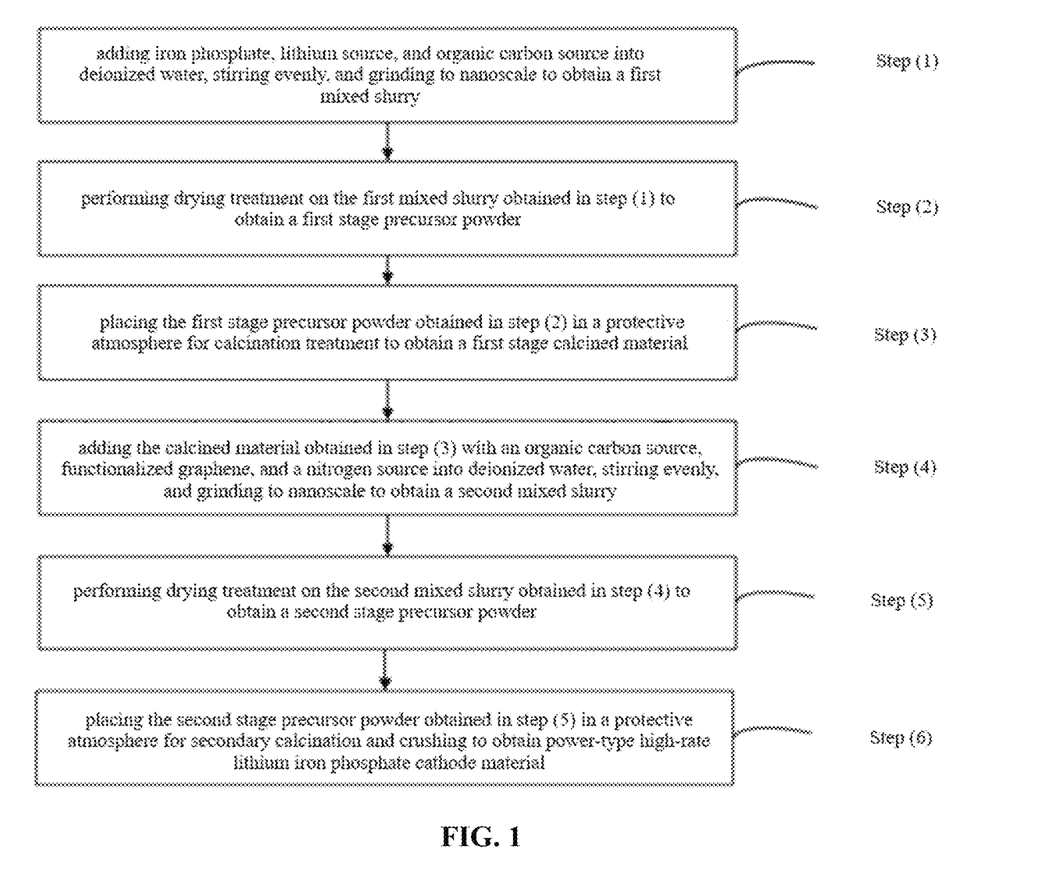
FIG. 1 is a schematic flow diagram of the preparation method for a power-type high-rate lithium iron phosphate cathode material provided by the present application.

The first aspect of the present application provides a preparation method for a power-type high-rate lithium iron phosphate cathode material, as shown in FIG. 1, comprising the following steps:

Step (1) adding iron phosphate, lithium source, and organic carbon source into deionized water, stirring evenly, and grinding to nanoscale to obtain a first mixed slurry;

Step (2) performing drying treatment on the first mixed slurry obtained in step (1) to obtain a first stage precursor powder;

Step (3) placing the first stage precursor powder obtained in step (2) in a protective atmosphere for calcination treatment to obtain a first stage calcined material;

Step (4) adding the calcined material obtained in step (3) with an organic carbon source, functionalized graphene, and a nitrogen source into deionized water, stirring evenly, and grinding to nanoscale to obtain a second mixed slurry;

Step (5) performing drying treatment on the second mixed slurry obtained in step (4) to obtain a second stage precursor powder;

Step (6) placing the second stage precursor powder obtained in step (5) in a protective atmosphere for secondary calcination and crushing to obtain power-type high-rate lithium iron phosphate cathode material.

In some embodiments, the functionalized graphene is grafted with a plurality of oxygen-containing functional groups on the surface of the graphene, which is conducive to making the functionalized graphene exhibit electronegativity first, facilitating interaction with the similarly electronegative iron phosphate precursor, thereby increasing electrostatic repulsion, improving the dispersion of the lithium iron phosphate cathode material, and further increasing the contact area within the lithium iron phosphate cathode material.

This embodiment adopts a two-stage calcination process: the first stage calcination allows the precursor iron phosphate to intercalate lithium and trace carbon coating and burns off functional groups. The second stage calcination performs carbon coating again, effectively inhibiting particle agglomeration and achieving uniform carbon coating while nanizing the material. At this time, since the functional groups have already been burned off during the first stage calcination, compared to the first stage, there will be no situation in the second stage calcination where lithium carbonate decomposes under heat to release gas, thus preventing the carbon film/carbon layer from being blown apart, thereby improving the quality of the power-type high-rate lithium iron phosphate cathode material. In addition, functionalized graphene, which overcomes the poor water solubility of traditional graphene, is used to compensate for the slightly inferior conductivity of reduced graphene oxide. Functionalized graphene exhibits electronegativity due to the grafting of many oxygen-containing functional groups on its surface, and the iron phosphate precursor also exhibits electronegativity. Thus, during the nanization of the precursor, the addition of functionalized graphene increases electrostatic repulsion, which aids in the dispersion of materials, thereby improving the uniformity of the distribution of power-type high-rate lithium iron phosphate cathode material. Finally, the material with functionalized graphene is heat-treated in an inert atmosphere, causing the functionalized graphene to lose its oxygen-containing functional groups, reducing or even eliminating its electronegativity. The functionalized graphene, combined with the organic carbon source, effectively coats the surface of the lithium iron phosphate, restricting crystal growth, further nanizing the lithium iron phosphate, and inhibiting agglomeration. Meanwhile, the present application involves nitrogen doping modification of the carbon coating, further enhancing the conductivity of the power-type high-rate lithium iron phosphate cathode composite material.

In some embodiments, the lithium source in step (1) is any one or a combination of lithium dihydrogen phosphate, lithium hydroxide, lithium carbonate, lithium phosphate, or lithium acetate, with a molar ratio of lithium source to iron phosphate of 1~1.05:1. The mass percentage of carbon element in the organic carbon source in the first mixed slurry is 0%~20%, and the solid content of the first mixed slurry is 30%~50%. The variety of lithium source options helps to expand the source and reduce production costs. Within the molar ratio range of the lithium source to iron phosphate in this example, lithium iron phosphate can be formed. The carbon content in the first mixed slurry can promote the effective coating of functionalized graphene combined with the organic carbon source on the surface of lithium iron phosphate, thereby better nanizing lithium iron phosphate and inhibiting agglomeration.

In some embodiments, the organic carbon source is any one or a combination of citric acid, glucose, sucrose, polyethylene glycol, urea, or polyacrylonitrile. The variety of choices for the organic carbon source is conducive to expanding the source and reducing production costs.

In some embodiments, the nanoscale has a particle size D50 of 0.1 μm~1.0 μm, i.e., 100 nm~1000 nm; It can nanize the lithium iron phosphate cathode material, increasing the contact area within the material.

In some embodiments, in step (4), the nitrogen source is any one or a combination of urea, melamine, ammonia water, or ammonium nitrate. In step (4), the contribution rate of the organic carbon source to the product's carbon content is 1%~2%, the contribution rate of functionalized graphene to the product's carbon content is 0.05%~0.2%, the addition amount of the nitrogen source is 0.05 mol %~0.2 mol % of the theoretical nitrogen element doping, and the solid content of the second mixed slurry is 30%~50%; Theoretical nitrogen element doping refers to the value obtained by completely replacing C elements with N elements. Adding an appropriate amount of N elements can substitute some C elements, resulting in excess electrons in C elements, thereby forming a P-type semiconductor. In this embodiments, nitrogen doping improves the conductivity of graphene and the carbon coating. Nitrogen atoms can form stable covalent bonds with carbon atoms, and the lengths of C—N bonds and C—C bonds are comparable. The impact of nitrogen atom doping on graphene lattice distortion is relatively small, making it easier for nitrogen atoms to be doped into carbon materials. Nitrogen doping also introduces a P-type semiconductor, increasing the number of electrons, thereby further enhancing the electronic conductivity of the composite material.

In some embodiments, the processing temperature for calcination in step (3) is 400° C.~1000° C., and the processing time is 3 h~15 h. By controlling the processing temperature of calcination, functional groups in the material can be burned off, preventing the decomposition of lithium carbonate and gas release in subsequent processes, thereby preventing the carbon film/layer from being blown apart and improving the quality and performance of the lithium iron phosphate cathode material.

In some embodiments, the drying treatment in step (5) is spray drying, which minimizes the moisture content of the material and enhances its performance.

In some embodiments, the parameters for crushing in step (6) are 0.4~0.6 μm, the processing temperature for secondary calcination in step (6) is 400° C.~1000° C., and the processing time is 3 h~15 h; Carbon coating is performed again through secondary calcination, effectively inhibiting particle agglomeration and achieving uniform carbon coating while nanizing the material; controlling the parameters of crushing, i.e., nanizing the lithium iron phosphate cathode material.

In a second aspect, the present application also provides a power-type high-rate lithium iron phosphate cathode material with the structural formula $Li_xFePO_4@C$, wherein $1 \leq X \leq 1.05$, and C is the elemental carbon coated on the outer layer, with the content of the elemental carbon being 0~20% of the total mass of the power-type high-rate lithium iron phosphate cathode material.

In this embodiment, the content of lithium and carbon elements is defined, which can form a lithium iron phosphate cathode material with stable performance.

In some embodiments, a power-type high-rate lithium iron phosphate cathode material is obtained by the preparation method described in any of the aspects of the first content.

In the third aspect, the present application also provides a lithium battery, where the cathode of the lithium battery is made from the power-type high-rate lithium iron phosphate cathode material obtained by the preparation method described in any of the aspects of the first content, or made from the power-type high-rate lithium iron phosphate cathode material described in the second content aspect.

For the beneficial effects of the second and third aspects, please refer to the description in the content of the first aspect, which will not be repeated here.

To ensure that the above implementation details and operations of the present application can be clearly understood by those skilled in the art, and to significantly demonstrate the good electrochemical performance of the power-type high-rate lithium iron phosphate cathode material and its preparation method in the present application, the following examples are provided to illustrate the above technical solutions.

Example 1

Figure 2:
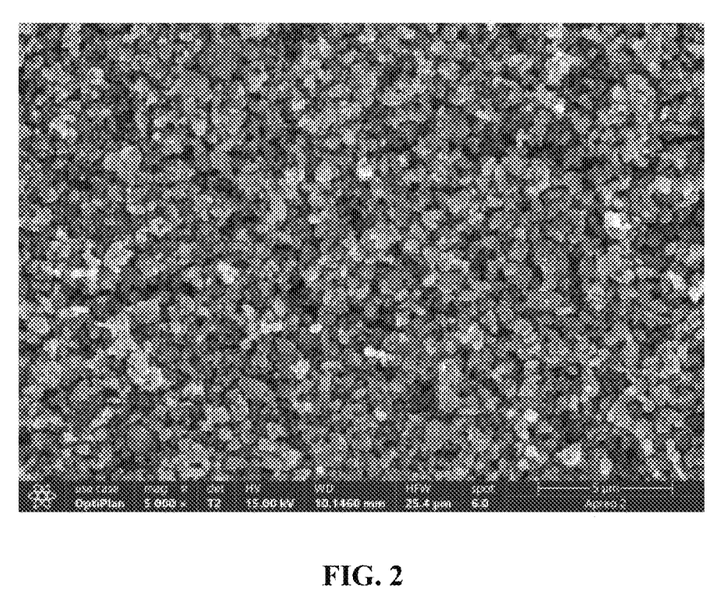
FIG. 2 is an SEM image of the material obtained in Example 1 of the present application.

A preparation method for a power-type high-rate lithium iron phosphate cathode material, comprising the following steps:
(1) First, taking 5895 ml of deionized water and adding it to the premix tank. Then weighing 3000 g of iron phosphate, 750 g of lithium carbonate, and 180 g of glucose, stirring at 20° C. for 1 hour to obtain a solid-liquid mixture, then transferring it to the sand mill for grinding until the particle size D50 reaches 400 nm;
(2) performing spray drying treatment to obtain a first stage precursor powder;
(3) then placing it in a box furnace filled with nitrogen gas and heating at 600° C. for 6 hours to obtain a first stage calcined material;
(4) Next, weighing 3000 g of calcined material, 225 g of glucose, 2.15 g of urea, and 6 g of functionalized graphene, and adding them to 4921.5 ml of deionized water, premixing uniformly and then transferring to the sand mill for grinding to a nano slurry with D50 of 300 nm.
(5) performing spray drying on the nano slurry;
(6) then placing it in a box furnace filled with nitrogen gas and heating at 750° C. for 9 hours. Finally, crushing it into powder with a D50 of approximately 0.5 μm, which is the power-type high-rate lithium iron phosphate cathode material. The SEM image of the obtained material is shown in FIG. 2.

Comparative Example 1

A preparation method for lithium iron phosphate cathode material comprises the following steps:
First, taking 6226.5 ml of deionized water and adding it to the premix tank. Then weighing 3000 g of iron phosphate, 750 g of lithium carbonate, 345 g of glucose, 2.15 g of urea, and 6 g of functionalized graphene. Stirring at 20° C. for 1 hour to obtain a solid-liquid mixture. Transferring it to a sand mill for grinding until the particle size D50 reaches 300 nm. Then performing spray drying and placing it in a box furnace filled with nitrogen gas for heat treatment at 750° C. for 9 hours to obtain lithium iron phosphate cathode material. Finally, crushing it into powder with a D50 of approximately 0.5 μm.

The difference between Comparative Example 1 and Example 1 is that only a first stage calcination process is used, without the second stage calcination process.

Comparative Example 2

A preparation method for lithium iron phosphate cathode material comprises the following steps:
First, taking 5895 ml of deionized water and adding it to the premix tank, then weighing 3000 g of iron phosphate, 750 g of lithium carbonate, and 180 g of glucose. Stirring at 20° C. for 1 hour to obtain a solid-liquid mixture, then transferring it to the sand mill for grinding until the particle size D50 reaches 400 nm. Then performing spray drying treatment, and placing it in a box furnace filled with nitrogen gas for heat treatment at 600° C. for 6 hours to obtain a calcined material. Then, weighing 3000 g of calcined material, 225 g of glucose, and 2.15 g of urea, and adding them to 4921.5 ml of deionized water. Premixing uniformly, then transferring to a sand mill for grinding until a nano slurry with D50 of 300 nm is obtained. Next, performing spray drying treatment, and then placing it in a box furnace filled with nitrogen gas for heat treatment at 750° C. for 9 hours to obtain lithium iron phosphate cathode material. Finally, crushing it into powder with D50 of approximately 0.5 μm.

The difference between Comparative Example 2 and Embodiment 1 is that functionalized graphene was not added.

Comparative Example 3

A preparation method for lithium iron phosphate cathode material comprises the following steps:

First, taking 5895 ml of deionized water and adding it to the premix tank, then weighing 3000 g of iron phosphate, 750 g of lithium carbonate, and 180 g of glucose. Stirring at 20° C. for 1 hour to obtain a solid-liquid mixture, then transferring it to the sand mill for grinding until the particle size D50 reaches 400 nm. Then performing spray drying treatment, and placing it in a box furnace filled with nitrogen gas for heat treatment at 600° C. for 6 hours to obtain a calcined material. Next, weighing 3000 g of calcined material, 225 g of glucose, and 6 g of functionalized graphene, and adding them to 4921.5 ml of deionized water. Premixing uniformly, then transferring to a sand mill to grind into a nano slurry with D50 of 300 nm. Then performing spray drying treatment, and placing it in a box furnace filled with nitrogen gas for heat treatment at 750° C. for 9 hours to obtain lithium iron phosphate cathode material. Finally, crushing it into a powder with D50 of about 0.5 μm.

The difference between Comparative Example 3 and Embodiment 1 is that no nitrogen source was added.

I. Physical and Chemical Properties Testing:

The composite materials prepared from each embodiment and comparative example are subjected to physical characteristics and electrochemical performance testing. The carbon content is the percentage of carbon per unit mass of the material, detected using an infrared carbon-sulfur analyzer. The composite materials obtained from each Embodiment and comparative example are used to assemble coin cells as follows: Mix the composite material, conductive carbon black, and binder polyvinylidene fluoride (PVDF) in a mass percentage of 90:5:5. Use N-methylpyrrolidone (NMP) as the solvent to form a slurry, evenly coat it on aluminum foil, dry it, compress it, and then vacuum dry at 120° C. for 12 hours to obtain the cathode sheet. The mass of the active material in the cathode sheet is approximately 12 mg. The anode uses a lithium metal sheet, the separator is a polypropylene porous membrane, and the electrolyte is 1 mol/L $LiPF_6$/EC+DEC+DMC (with a volume ratio of EC:DEC:DMC=1:1:1). The coin cell is tested for charge-discharge specific capacity in the voltage range of 2.0V-3.8V.

Figure 3:
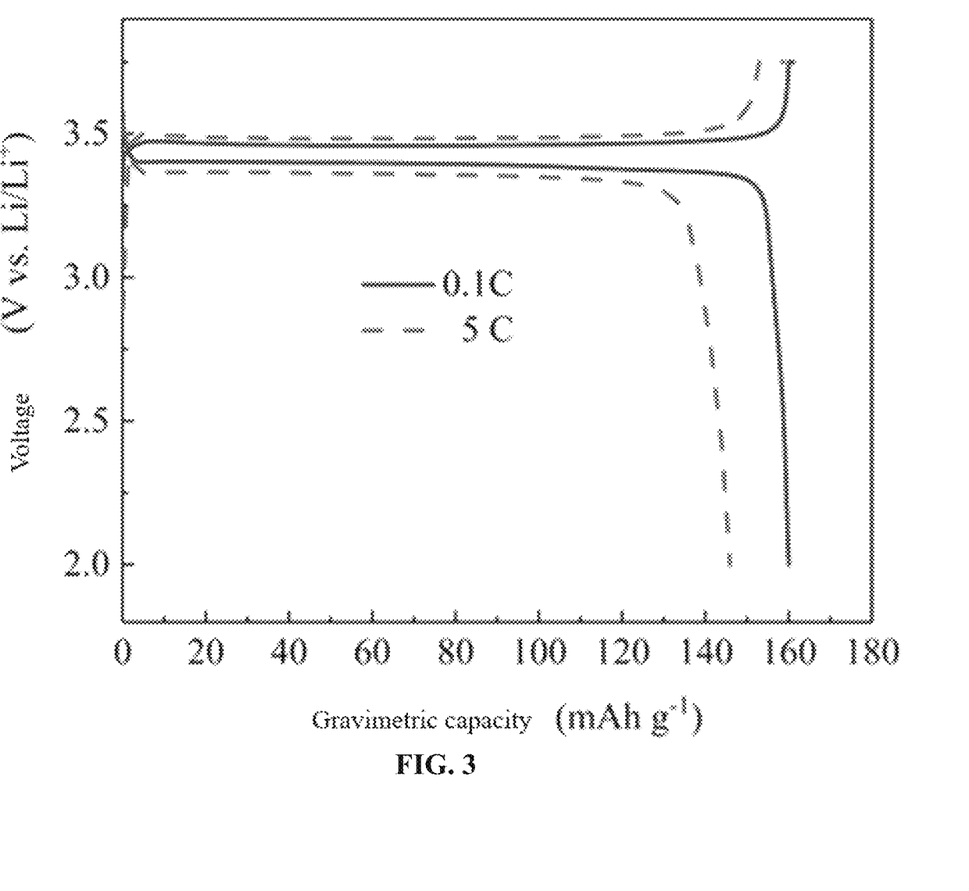
FIG. 3 is the charge-discharge curve of the material obtained in Example 1 of the present application.
Figure 4:
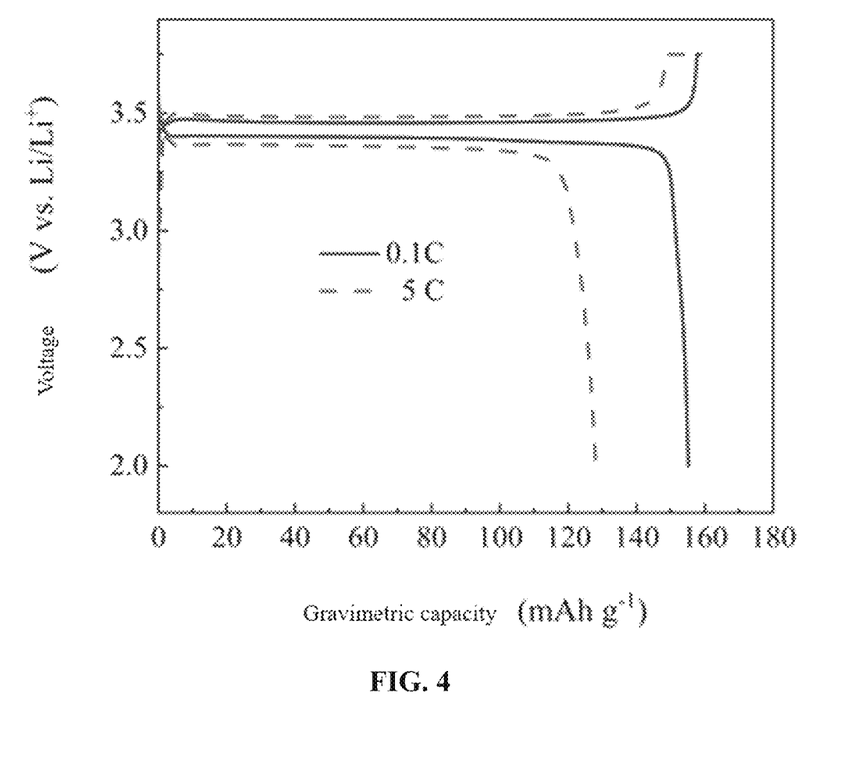
FIG. 4 is the charge-discharge curve of the material obtained in Comparative Example 1 of the present application.
Figure 5:
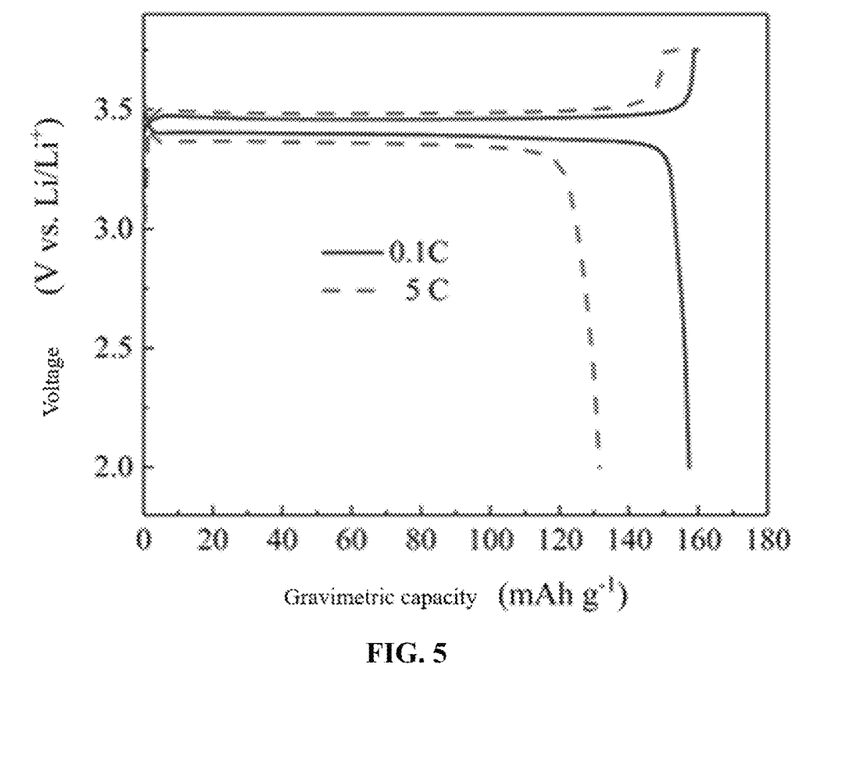
FIG. 5 is the charge-discharge curve of the material obtained in Comparative Example 2 of the present application.
Figure 6:
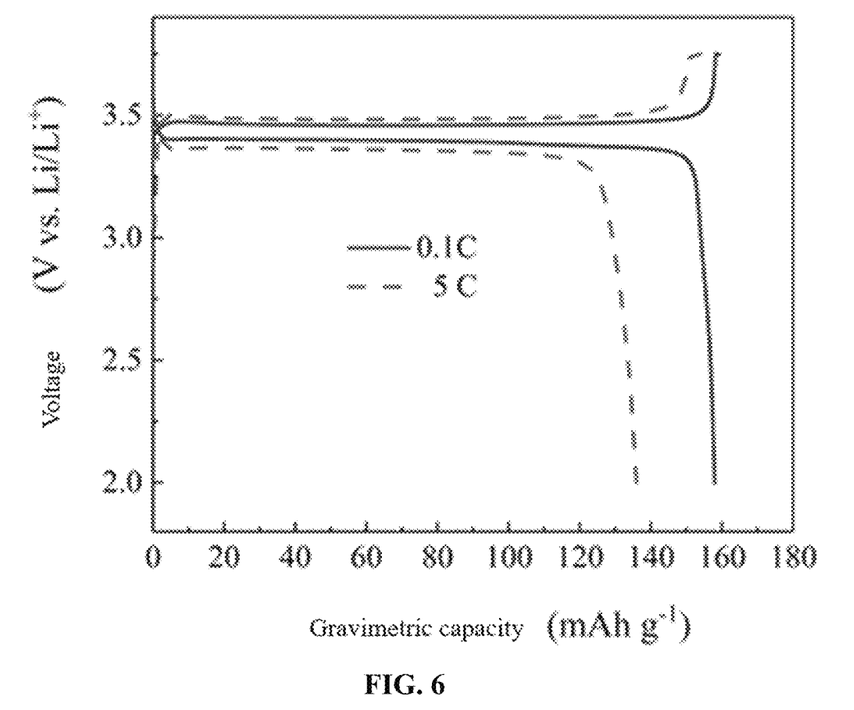
FIG. 6 is the charge-discharge curve of the material obtained in Comparative Example 3 of the present application.

Among them, the charge-discharge curve of Example 1 is shown in FIG. 3, the charge-discharge curve of Comparative Example 1 is shown in FIG. 4, the charge-discharge curve of Comparative Example 2 is shown in FIG. 5, and the charge-discharge curve of Comparative Example 3 is shown in FIG. 6;

The charge-discharge performance test results are shown in Table 1:

TABLE 1

| | Physical and chemical properties test results | | | |
|---|---|---|---|---|
| Embodiments | 0.1C charging (mAh/g) | 0.1C discharge (mAh/g) | 5C charging (mAh/g) | 5C discharge (mAh/g) |
| Embodiment 1 | 161.02 | 160.70 | 160.22 | 145.86 |
| Comparative Example 1 | 158.69 | 155.23 | 154.86 | 128.07 |
| Comparative Example 2 | 159.78 | 157.39 | 156.36 | 131.54 |
| Comparative Example 3 | 159.22 | 157.98 | 157.01 | 135.93 |

From the data in the table above, it can be seen that Comparative Example 1, which uses a one stage sintering process, shows a significant difference in capacity compared to Embodiment 1, which uses a two stage sintering process, whether at 0.1 C charge-discharge or at 5 C high-rate charge-discharge. This indicates that the two-step sintering process positively promotes the electrochemical performance of lithium iron phosphate. Comparative Example 2 did not add functionalized graphene, and Comparative Example 3 did not include nitrogen doping. Both of these experimental examples show poorer electrochemical performance compared to Embodiment 1, indicating that functionalized graphene and nitrogen doping both enhance the rate performance of lithium iron phosphate. Combining the above experimental examples, it can be concluded that the two-stage sintering process combined with the comprehensive modification of functionalized graphene and nitrogen doping can significantly enhance the rate performance of lithium iron phosphate materials.

The above-mentioned examples are only used to illustrate the technical solutions of The present application and are not intended to limit them; Although the present application has been described in detail with reference to the foregoing examples, those skilled in the art should understand that they can still modify the technical solutions described in the foregoing examples or make equivalent replacements for some of the technical features; And these modifications or replacements do not deviate the essence of the corresponding technical solutions from the spirit and scope of the technical solutions of each embodiment of the present application, and should all be included within the protection scope of The present application.

What is claimed is:

1. A preparation method for power-type high-rate lithium iron phosphate cathode material, characterized by comprising the following steps:
   (1) adding iron phosphate, lithium source, and organic carbon source into deionized water, stirring evenly, and grinding to nanoscale to obtain a first mixed slurry;
   (2) performing drying treatment on the first mixed slurry obtained in step (1) to obtain a first stage precursor powder;
   (3) placing the first stage precursor powder obtained in step (2) in a protective atmosphere for calcination treatment to obtain a first stage calcined material; the processing temperature for calcination in step (3) is 400° C.~1000° C., and the processing time is 3 h~15 h;
   (4) adding the calcined material obtained in step (3) with an organic carbon source, functionalized graphene, and a nitrogen source into deionized water, stirring evenly, and grinding to nanoscale to obtain a second mixed slurry; the functionalized graphene is grafted with a plurality of oxygen-containing functional groups grafted on the surface, showing electronegativity;
   (5) performing drying treatment on the second mixed slurry obtained in step (4) to obtain a second stage precursor powder;
   (6) placing the second stage precursor powder obtained in step (5) in a protective atmosphere for secondary calcination and crushing to obtain power-type high-rate lithium iron phosphate cathode material.

2. The preparation method according to claim 1, characterized in that, in step (1), the lithium source is any one or a combination of lithium dihydrogen phosphate, lithium hydroxide, lithium carbonate, lithium phosphate, or lithium acetate, with a molar ratio of the lithium source to iron phosphate of 1~1.05:1, wherein the mass percentage of carbon element in the organic carbon source in the first mixed slurry is greater than 0 and less than or equal to 20%, and the solid content of the first mixed slurry is 30%~50%.

3. The preparation method according to claim 1, characterized in that the organic carbon source is any one or a combination of citric acid, glucose, sucrose, polyethylene glycol, urea, or polyacrylonitrile.

4. The preparation method according to claim 1, characterized in that the nanoscale particle size D50 is 0.1 μm~1.0 μm.

5. The preparation method according to claim 1, characterized in that in step (4), the nitrogen source is any one or a combination of urea, melamine, ammonia water, or ammonium nitrate; the contribution rate of the organic carbon source to the product's carbon content is 1%~2%; the contribution rate of the functionalized graphene to the product's carbon content is 0.05%~0.2%; the addition amount of the nitrogen source is 0.05 mol %~0.2 mol % of the theoretical nitrogen element doping; and the solid content of the second mixed slurry is 30%~50%.

6. The preparation method according to claim 1, characterized in that the drying treatment in step (5) is spray drying.

7. The preparation method according to claim 1, characterized in that the parameters for crushing in step (6) are 0.4 μm~0.6 μm, the processing temperature for secondary calcination in step (6) is 400° C.~1000° C., and the processing time is 3 h~15 h.

8. A power-type high-rate lithium iron phosphate cathode material, characterized in that the power-type high-rate lithium iron phosphate cathode material is prepared by the preparation method according to claim 1, and the structural formula $Li_xFePO_4@C$, wherein $1 \leq X \leq 1.05$; the Cis elemental carbon coated on the outer layer, and the content of the elemental carbon is greater than 0 and less than or equal to 20% of the total mass of the power-type high-rate lithium iron phosphate cathode material.

9. A lithium battery, characterized in that the cathode of the lithium battery is made from the power-type high-rate lithium iron phosphate cathode material according to claim 8.

* * * * *